United States Patent [19]

Keita et al.

[11] Patent Number: 5,741,831
[45] Date of Patent: Apr. 21, 1998

[54] POLYMERIZABLE COMPOSITIONS BASED ON THIO (METH) ACRYLATE MONOMERS, POLYMERS WITH A LOW YELLOW INDEX OBTAINED FROM SUCH COMPOSITIONS, AND CORRESPONDING OPHTHALMIC LENSES

[75] Inventors: Gabriel Keita, Courbevoie, France; Peiqi Jiang, Tokyo, Japan

[73] Assignee: Essilor International - Compagnie Generale d'Optique, Charenton, France

[21] Appl. No.: 652,244

[22] Filed: May 23, 1996

[30] Foreign Application Priority Data

May 31, 1995 [FR] France ................................ 95 06442

[51] Int. Cl.$^6$ ........................ C08F 228/02; C08F 228/04
[52] U.S. Cl. .................... 523/106; 522/180; 526/286; 526/289; 351/159; 524/547
[58] Field of Search ....................... 523/106; 524/547; 526/286, 289; 522/180; 351/159

[56] References Cited

U.S. PATENT DOCUMENTS

| | | |
|---|---|---|
| 4,606,864 | 8/1986 | Warren . |
| 5,442,022 | 8/1995 | Keita et al. . |

FOREIGN PATENT DOCUMENTS

| | | |
|---|---|---|
| 0 273 661 | 7/1988 | European Pat. Off. . |
| 0273710B1 | 7/1988 | European Pat. Off. . |
| 0382477A1 | 8/1990 | European Pat. Off. . |
| 0384725A1 | 8/1990 | European Pat. Off. . |
| 0 394 495 | 10/1990 | European Pat. Off. . |
| 63316766 | 12/1988 | Japan . |

*Primary Examiner*—Andrew E.C. Merriam
*Attorney, Agent, or Firm*—Evenson, McKeown, Edwards & Lenahan, PLLC

[57] ABSTRACT

Transparent polymer composition comprising:

a component A comprising:
  at least 10% by weight of a monomer or of a mixture of monomers (I), containing at least one thioacrylate or thiomethacrylate function;
  0 to 90% by weight of one or more monomers (II) which are copolymerizable by a radical route, preferably mono- or polyfunctional vinyl, acrylic or methacrylic; and a component B comprising, relative to the weight of the component A:
  0.1 to 15% by weight of one or more monomers (III) containing an ethylenic unsaturation which does not contribute to an aromatic system and having a carbon bearing a free hydroxyl group in an α position relative to the ethylenic unsaturation.

Application to the manufacture of ophthalmic lenses.

16 Claims, No Drawings

POLYMERIZABLE COMPOSITIONS BASED ON THIO (METH) ACRYLATE MONOMERS, POLYMERS WITH A LOW YELLOW INDEX OBTAINED FROM SUCH COMPOSITIONS, AND CORRESPONDING OPHTHALMIC LENSES

The present invention relates generally to polymerizable compositions based on thio(meth)acrylate monomers, leading to transparent organic polymers with a low yellow index.

In the last years there has been an increasing demand for ophthalmic lenses which, while guaranteeing the same optical qualities as the lenses made of organic polymer material already known, are thinner and are thus lighter.

Various materials have been developed to satisfy this demand.

One family of materials recently tested in the ophthalmic field is the family of thio(meth)acrylates.

The materials obtained by polymerization of these monomers, alone or in the presence of comonomers, have a high refractive index which may be up to, or even exceed, n=1.6.

Thus, on account of this high refractive index, it is possible to manufacture, with these materials, thinner lenses for an equivalent correcting power (optical power).

Such materials and their applications in the ophthalmic field are described, in particular, in patents U.S. Pat. No. 4,606,864, EP-A-273,661, EP-A-273,710, EP-A-382,477, EP-A-384,725 and EP-A-394,495.

However, these materials have the drawback of having a high yellow index.

It is desirable to obtain polymers having no residual colour after polymerization while at the same time retaining their mechanical properties, in particular their thermomechanical properties, and while preserving, or even improving, their resistance to ageing, that is to say while avoiding an increase in the yellowing over time under irradiation by ultraviolet light.

It has already been recommended, for example in French patent application FR-A-2,699,541 in the name of Essilor, to use compositions including an aromatic monomer, in particular polyethoxylated di(meth)acrylates derived from bisphenol A in a proportion of at least 50% by weight of these derivatives in the polymerizable mixture, and anti-yellow agents derived from allyl alcohol.

Although the transparent compositions described in French patent application FR-A-2,699,541 prove to be particularly satisfactory in ophthalmic applications, it would be desirable to be able to formulate transparent polymer compositions useful in the ophthalmic field, having good thermomechanical properties, a low yellow index and a high refractive index, of about n=1.6.

The above aims are achieved, according to the invention, by preparing a transparent polymer composition comprising:

a component A comprising:
at least 10% by weight of a monomer or of a mixture of monomers (I), containing at least one thioacrylate or thiomethacrylate function;
0 to 90% by weight of one or more monomers (II) which are copolymerizable by a radical route, preferably mono- or polyfunctional vinyl, acrylic or methacrylic; and a component B comprising, relative to the weight of the component A:
0.1 to 15% by weight of a monomer (III) containing an ethylenic unsaturation which does not contribute to an aromatic system and having a carbon bearing a free hydroxyl group in an α position relative to the ethylenic unsaturation.

The monomer or mixture of monomers (I) of the component A of the transparent polymer composition according to the invention encompasses any monomer containing at least one thioacrylate or thiomethacrylate function.

The monomers (I) preferably correspond to the formula:

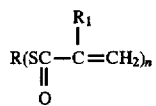

in which:

R represents a linear or branched, monovalent or polyvalent aliphatic hydrocarbon radical or a monovalent or polyvalent aromatic group linked directly to the sulphur atom of the thio(meth)acrylate group or groups by an aromatic ring or by an intermediate linear alkyl chain, it being possible for the radical R to contain in its chain one or more groups chosen from —O—, —S— and —S—,

$R_1$ represents hydrogen or —$CH_3$; and
n is an integer from 1 to 6, preferably from 1 to 3.

Among the monovalent radicals R which may be mentioned are linear or branched $C_1$ to $C_5$ alkyl radicals, the radicals of formula:

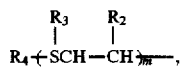

in which $R_2$ and $R_3$ are, independently of each other, H or a linear or branched $C_1$–$C_5$ alkyl radical;

$R_4$ is a linear or branched $C_1$–$C_5$ alkyl radical, a $C_7$–$C_{10}$ aralkyl radical or a $C_6$–$C_{12}$ aryl radical, optionally substituted, in particular with alkyl and/or halogen groups; and m is an integer from 1 to 4.

Among the preferred monovalent radicals R which may be mentioned are:

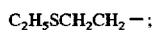

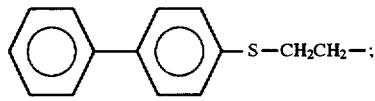

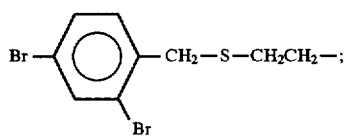

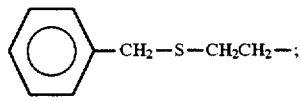

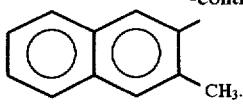

Monomers of formula (I) for which n=1 and as are defined above are described, inter alia, in patents U.S. Pat. No. 4,606,864, JP-63316766 and EP-A-0,384,725.

Among the divalent radicals R falling within the scope of the monomers of formula (I), mention may be made of linear or branched $C_2$ to $C_{10}$ alkylene radicals which may contain in their chain one or more —O—, —S— or

groups, alkylidene radicals of formula

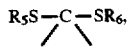

in which $R_5$ and $R_6$ are $C_1$–$C_5$ alkyl radicals, radicals of formula:

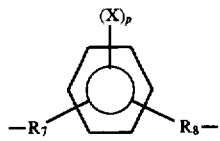

in which $R_7$ and $R_8$ are linear or branched $C_1$–$C_5$ alkylene groups which may contain one or more —O—, —S— or

groups in their chains and X is chosen from $C_1$–$C_5$ alkyl radicals and halogens, and p is an integer from 0 to 4, and radicals of formula:

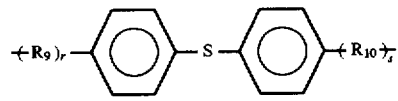

in which $R_9$ and $R_{10}$ are linear or branched $C_1$ to $C_5$ alkyl radicals which may contain in their chain one or more —O—, —S— or

groups and r and s are equal to 0 or 1.

Among the preferred divalent radicals R which may be mentioned are the radicals:

—$(CH_2)_x$ where x is an integer from 2 to 8, the radicals $(CH_2CH_2O)_yCH_2CH_2$— where y is an integer from 1 to 4, the radicals $(CH_2CH_2S)_zCH_2CH_2$— where z is an integer from 1 to 4, the radicals $(CH_2)_{u'}$–$(S(CH_2)_{v'})_{x'}S$–$(CH_2)_{w'}$– where x' is equal to 0 or 1, and u', v' and w' are integers from 2 to 6, the radicals of formula:

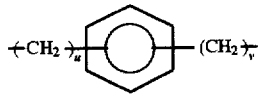

where u and v are integers from 1 to 4,

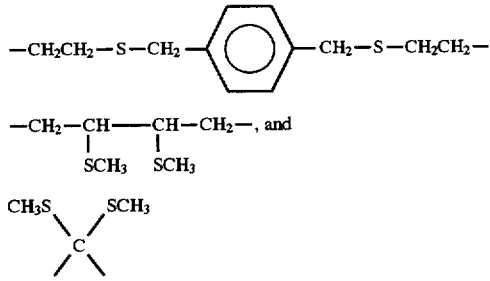

The divalent radicals R particularly preferred are:

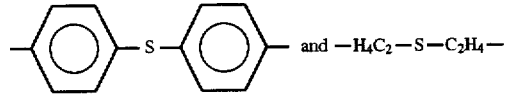

Divalent monomers of formula (I) are described, inter alia, in patents EP-A-273,661, EP-A-273,710 and EP-A-384,725.

Among the trivalent radicals R of the monomers of formula (I) which may be mentioned are $C_3$ to $C_{10}$ alkyltriyl radicals which may contain in their chain one or more —O—, —S— or

groups, trivalent alkylaryl radicals whose alkyl chains may contain one or more —S— or —O— groups, and trivalent aryl groups.

Among the radicals R which are trivalent or of higher valency, mention may be made of:

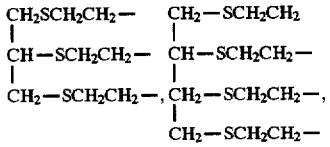

etc.

Among the monomers of formula (I) recommended in the present invention, mention may be made of:

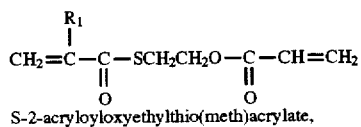

S-2-acryloyloxyethylthio(meth)acrylate,

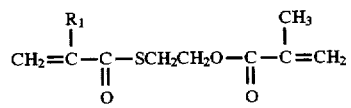

-continued
S-2-methacryloyloxyethylthio(meth)acrylate,

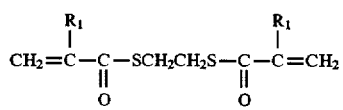
1,2-bis((meth)acryloylthio)ethane,

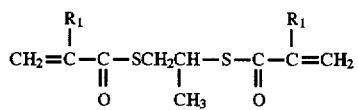
1,2-bis((meth)acryloylthio)propane,

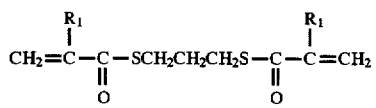
1,3-bis((meth)acryloylthio)propane,

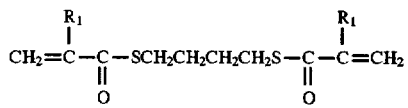
1,4-bis((meth)acryloylthio)butane,

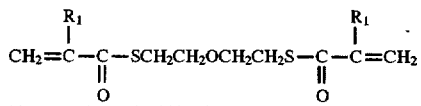
bis(2-(meth)acryloylthioethyl)ether,

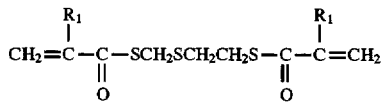
bis(2-(meth)acryloylthioethyl)sulphide,

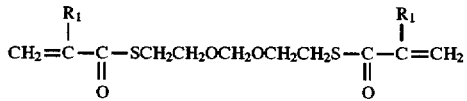
bis(2-(meth)acryloylthioethoxy)methane,

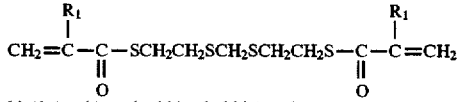
bis(2-(meth)acryloylthioethylthio)methane,

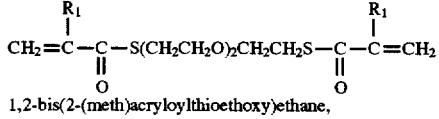
1,2-bis(2-(meth)acryloylthioethoxy)ethane,

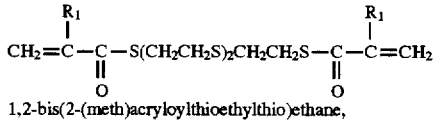
1,2-bis(2-(meth)acryloylthioethylthio)ethane,

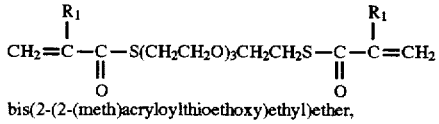
bis(2-(2-(meth)acryloylthioethoxy)ethyl)ether,

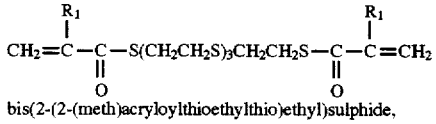
bis(2-(2-(meth)acryloylthioethylthio)ethyl)sulphide,

-continued

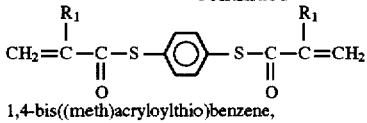
1,4-bis((meth)acryloylthio)benzene,

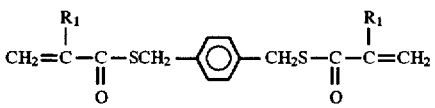
1,4-bis((meth)acryloylthiomethyl)benzene,

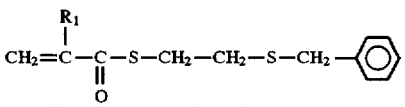
benzylthioethyl thio(meth)acrylate,

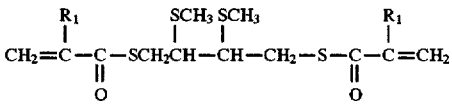
1,4-(bis(meth)acryloylthio)-2,3-dimethylthiobutane,

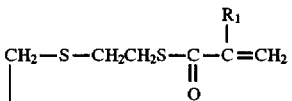
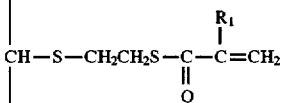
1,2,3-tris((meth)acryloylthioethyl)thiolpropane, and

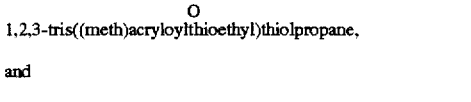
bis((meth)acryloylthiophenyl)sulphide, where $R_1$ represents a hydrogen atom or a methyl group.

The monomers most particularly recommended in the present invention are bis(4-methacryloylthiophenyl) sulphide (BMATPS) and bis(2-methacryloylthioethyl) sulphide (BMATES).

The mixture or mixtures of monomers of formula (I) represent at least 10% by weight of the constituents of component A relative to the total weight of this component A. Preferably, the monomer or monomers of formula (I) represent 20 to 100% by weight of the component A.

Preferably, when the compounds of formula (I) are aromatic compounds, they represent from 20 to 60% by weight and, better still, from 20 to 40% by weight of the component A.

Preferably, when the compounds of formula (I) are not aromatic, they represent from 30 to 100% by weight and, better still, from 50 to 100% by weight of the component A.

It is particularly surprising to observe that the anti-yellow effect manifests itself even for non-aromatic monomers of formula (I).

The component A of the transparent polymer compositions according to the invention also comprises 0 to 90% by weight of one or more mono- or polyfunctional vinyl, acrylic or methacrylic comonomers (II). Any vinyl, acrylic or methacrylic monomer which is compatible in the component A may be used as comonomer (II).

Among the monomers (II) copolymerizable with the monomers (I), mention may be made of unsaturated fatty acid esters, vinylaromatic compounds, unsaturated fatty acids and derivatives thereof, unsaturated dibasic acids and derivatives thereof, and vinyl cyanide compounds such as (meth)acrylonitrile.

The unsaturated fatty acids and derivatives thereof comprise (meth)acrylamides such as (meth)acrylamide, N,N-dimethyl(meth)acrylamide, N,N-diethyl(meth)acrylamide and the like, and unsaturated fatty acids such as (meth) acrylic acids, unsaturated fatty acid esters, for example alkyl (meth)acrylates such as methyl (meth)acrylate, ethyl (meth) acrylate, butyl (meth)acrylate, 2-ethylhexyl (meth)acrylate, octyl (meth)acrylate, dodecyl (meth)acrylate, octadecyl (meth)acrylate, cyclohexyl (meth)acrylate, methylcyclohexyl (meth)acrylate, (iso)bornyl (meth)acrylate, adamantyl (meth)acrylate and the like; aromatic esters of acrylic acids, such as phenyl (meth)acrylate, benzyl (meth)acrylate, 1-naphthyl (meth)acrylate, fluorophenyl (meth)acrylate, chlorophenyl (meth)acrylate, bromophenyl (meth)acrylate, tribromophenyl (meth)acrylate, methoxyphenyl (meth) acrylate, cyanophenyl (meth)acrylate, biphenyl (meth) acrylate, bromobenzyl (meth)acrylate and the like; haloalkyl (meth)acrylates such as fluoromethyl (meth)acrylate, chloromethyl (meth)acrylate, bromoethyl (meth)acrylate, trichloromethyl (meth)acrylate and the like; 2-hydroxyethyl (meth)acrylate, the (meth)acrylic acid ester of polyethylene glycol, etc.; (meth)acrylic acid esters such as glycidyl (meth) acrylate and alkylamino (meth)acrylates.

It is also possible to use α-substituted acrylic acid esters such as α-fluoroacrylic acid esters, α-cyanoacrylic acid esters and the like.

Vinylaromatic compounds which may be mentioned are styrene or α-substituted styrenes such as α-methylstyrene, α-ethylstyrene, α-chlorostyrene and the like, and styrenes with a substituted ring such as fluorostyrene, chlorostyrene, bromostyrene, chloromethylstyrene and methoxystyrene.

Unsaturated dibasic acids and derivatives thereof comprise N-substituted maleimides such as N-methylmaleimide, N-ethylmaleimide, N-butylmaleimide, N-cyclohexylmaleimide, N-phenylmaleimide, N-methylphenylmaleimide, N-chlorophenylmaleimide, N-carboxyphenylmaleimide and the like, maleimic acid, maleic anhydride and fumaric acid.

Besides the monofunctional vinyl monomers, crosslinkable polyfunctional monomers may also be used as comonomers (II) according to the present invention. For example, difunctional crosslinkable monomers may be used, among which are di(meth)acrylates such as ethylene glycol di(meth)acrylate, diethylene glycol di(meth)acrylate, triethylene glycol di(meth)acrylate, tetraethylene glycol di(meth) acrylate, tripropylene glycol di(meth)acrylate, 1,3-butylene glycol di(meth)acrylate, 1,4-butanediol di(meth)acrylate, 1,5-pentanediol di(meth)acrylate, 1,6-hexanediol di(meth) acrylate, neopentylglycol di(meth)acrylate, the di(meth) acrylate ester of hydroxypivalic acid neopentylglycol, oligoester di(meth)acrylate, polybutadiene di(meth)acrylate, 2,2-bis(4-(meth)acryloyloxyphenyl)propane, 2,2-bis(4-(ω-(meth)acryloyloxypropylethoxy)phenyl)propane, 2,2-bis(4-(ω-(meth)acryloyloxypropylethoxy)dibromophenyl) propane, 2,2bis(4-(ω-(meth)acryloyloxypolypropoxy) phenyl)propane, bis(4-ω-(meth)acryloyloxypolyethoxy) phenyl)methane and the like, diallyl phthalate, diallyl isophthalate, diallyl terephthalate, diallyl carbonate, diethylene glycol diallyl carbonate, divinylbenzene, divinylbiphenyl, N,N'-m-phenylenebis(maleimide), etc.; trifunctional crosslinkable monomers such as trimethylolethane tri(meth)acrylate, trimethylolpropane tri(meth) acrylate, pentaerythritol tri(meth)acrylate, tri(meth)allyl isocyanurate, triallyl trimellitate and diallyl chlorendate; and tetrafunctional crosslinkable monomers such as pentaerythritol tetra(meth)acrylate.

A particularly recommended class of comonomers (II) are the monomers corresponding to the formula (IV):

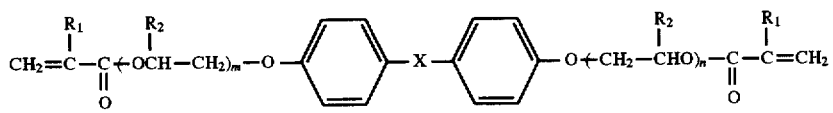

in which $R_1$ and $R_2$ denote, independently of each other, hydrogen or a $C_1$–$C_6$ lower alkyl radical, X denotes O, S, CO, $SO_2$, —$CH_2$—, —CH=CH— or

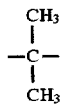

the sum m+n is between 0 and 10 inclusive.

Among the particularly recommended comonomers (II) which may be mentioned are phenyl (meth)acrylate, benzyl (meth)acrylate, 1-naphthyl (meth)acrylate, ethylene glycol di(meth)acrylate, diethylene glycol di(meth)acrylate, 1,4-butanediol di(meth)acrylate, 2,2bis(4-(meth) acryloyloxyphenyl)propane, 2,2-bis(4-(ω-(meth) acryloyloxypolyethoxy)phenyl)propane and in particular the compounds of formula (IV) in which $R_1$=$CH_3$, $R_2$=H and m+n=2.6 (EBADMA), m+n=4 (DBADMA), m+n=10 (OBADMA), ethoxytribromobenzyl acrylate (TBrBEA), polyethylene glycol dimethacrylate (PBOMA), phenoxyethyl acrylate (AMP), the methacryl esters marketed by the company Hitachi Chemical Corporation under the name FA 513 and the compounds sold by the company Nippon Kayaku Company under the name R604.

The comonomers (II) may represent from 0 to 90% by weight of the component A and preferably represent 80 to 20%.

Preferably also, when the monomers of formula (IV) are used among the comonomers (II) of the component A, these monomers are preferably used in an amount of less than 50% by weight relative to the weight of the component A.

The component B of the transparent polymer compositions according to the invention is a monomer or a mixture of monomers (III) containing an ethylenic unsaturation which does not contribute to an aromatic system, having a carbon bearing a free hydroxyl group in an alpha position relative to the ethylenic unsaturation.

The unsaturated ethylenic monomers (III) used according to the present invention are preferably chosen from the monomers corresponding to the formula:

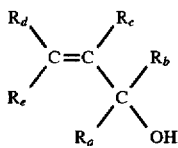

in which:

- $R_a$ and $R_b$ represent hydrogen, one of the groups $R_a$ and $R_b$ represents hydrogen while the other forms with the group $R_e$ a $C_5$–$C_{10}$ ring which may be substituted with one or more linear or branched $C_1$–$C_4$ alkyl groups or one or more $C_2$–$C_4$ alkylene groups; or one of the groups $R_a$ and $R_b$ may represent hydrogen while the other represents a $C_1$–$C_6$ aliphatic alkyl group, a $C_4$–$C_{16}$ cyclic hydrocarbon group or a $C_6$–$C_{16}$ aromatic hydrocarbon group;
- $R_c$, $R_d$ and $R_e$ represent, independently of each other, hydrogen or a $C_1$–$C_6$ alkyl group which may be substituted with one or more OH groups, and in which the chain may be interrupted by one or more ether, ester or ketone groups; a $C_6$–$C_{16}$ aromatic hydrocarbon group or a $C_4$–$C_{16}$ cyclic hydrocarbon group;
- $R_e$ may form with one of the groups $R_a$ or $R_b$ a $C_5$–$C_{10}$ ring which may be substituted with one or more linear or branched $C_1$–$C_4$ alkyl groups or one or more $C_2$–$C_4$ alkylene groups;
- $R_c$ and $R_d$ may form a $C_5$–$C_{10}$ ring which may be substituted with one or more $C_1$–$C_4$ alkyl groups or $C_2$–$C_4$ alkylene groups; two or more of the carbon atoms of the $C_5$–$C_{10}$ ring formed with $R_a$ or $R_b$ and $R_e$ or with $R_c$ and $R_d$ may be linked by a hydrocarbon bridge.

According to the invention, the $C_1$–$C_6$ alkyl group preferably represents a methyl or ethyl group.

The particularly recommended monomers (III) are allyl alcohol, methallyl alcohol, crotyl alcohol, 2-cyclohexen-1-ol, trans-2-hexen-1-ol, cis-2-butene-1,4-diol, 3-methyl-2-buten-1-ol, trans-2-methyl-3-phenyl-2-propen-1-ol, 3-buten-2-ol, carveol, myrtenol, verbenol and trans-cinnamyl alcohol.

The amount of monomers (III) in the compositions according to the invention is between 0.1 and 15 parts by weight per 100 parts by weight of the component A, preferably from 1 to 5 parts by weight.

The polymerization is carried out in a known way by using an initial mixture containing the various monomers of the polymerizable composition, the polymerization reaction being catalysable using catalysts such as benzoyl peroxide, cyclohexyl peroxydicarbonate, diisopropyl peroxydicarbonate or 2,2'-azobisisobutyronitrile, or photoinitiators such as benzoin ethyl ether, 2,4,6-trimethylbenzoyl diphenylphosphine and 1-hydroxycyclohexyl phenyl ketone.

Ophthalmic lenses were prepared by introducing the desired composition containing the various monomers described above into an apparatus consisting of a glass mould in two parts and carrying out a polymerization by UV irradiation.

The polymer lens thus produced is subsequently recured for a period and at a temperature which are sufficient to eliminate the residual constraints of the lens. The temperature is generally between 100° and 120° C. and the recuring is carried out for about 1 to 5 hours.

It is also possible to carry out the polymerization in moulds having one face in the final geometry of the lens and a second face which is not regulated as a function of the geometry of the surface of the final lens and makes it possible to prepare a second face which may be surfaced as required.

The subject of the invention is also the polymerizable composition as defined above in its application to the preparation of polymer compositions.

The polymers thus obtained, in particular after the moulding, may be used for the preparation of ophthalmic elements such as ophthalmic lenses, spectacle lenses or for lenses used in viewers, and various apparatus optics such as photographic cameras, film cameras and microscopes.

The yellow index is determined by a spectroscopic route. For the spectroscopic route, a standardized method is used (ASTM D-1925-63), of yellow index which is defined as follows:

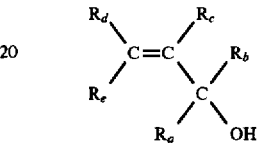

where X, Y and Z are the trichromatic coordinates of the sample, measured by visible UV spectrophotometry over the entire spectrum between 380 and 780 nanometers. The value Yi is given after recuring.

The examples which follow are intended to illustrate the invention without, however, being limiting in nature.

In each case, a primary mixture was prepared by homogenization of the amounts of monomers as indicated in Table 1 below.

TABLE 1

| | MIXTURE No | | | | | | | |
|---|---|---|---|---|---|---|---|---|
| | 1 | 2 | 3 | 4 | 5 | 6 | 7 | 8 |
| BMATPS | 20 | 25 | 28 | — | — | — | — | — |
| BMATES | — | — | 30 | 35 | 40 | 33 | 30 | 100 |
| EBADMA | 40 | 40 | 25 | 55 | 22 | 32 | 40 | — |
| DBADMA | — | — | — | — | 20 | 10 | — | — |
| OBADMA | — | — | 7 | — | — | 10 | 15 | — |
| BMA | 10 | 10 | — | 5 | — | — | 9 | — |
| TBrBEA | 10 | — | 10 | 5 | 8 | — | — | — |
| PBOMA | 20 | 25 | — | — | — | — | — | — |
| AMP | — | — | — | — | 10 | — | — | — |
| FA-513 | — | — | — | — | — | 10 | — | — |
| R-604 | — | — | — | — | — | 5 | 6 | — |

BMATPS = bis(4-methacryloylthiophenyl) sulphide
BMATES = bis(2-methacryloylthioethyl) sulphide
EBADMA = compound of formula (IV) with $R_1 = CH_3$, $R_2 = H$ and m + n = 2.6
DBADMA = compound of formula (IV) with $R_1 = CH_3$, $R_2 = H$ and m + n = 4
OBADMA = compound of formula (IV) with $R_1 = CH_3$, $R_2 = H$ and m + n = 10
BMA = benzyl methacrylate
TBrBEA = tribromobenzyl ethoxyacrylate
PBOMA = polybutylene glycol dimethacrylate
AMP = phenoxyethyl acrylate

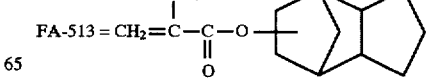

TABLE 1-continued

| | | | MIXTURE No | | | | |
|---|---|---|---|---|---|---|---|
| 1 | 2 | 3 | 4 | 5 | 6 | 7 | 8 |

R-604 = CH₂=CH—C(=O)—OCH₂—C(CH₃)(CH₃)—CH(O—CH₂)(O—CH₂)—C(CH₂CH₃)(CH₂—O—C(=O)—CH=CH₂)

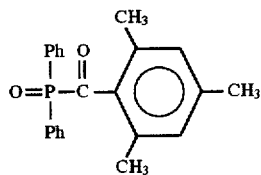

and Irgacure®184 is 1-hydroxycyclohexyl phenyl ketone of formula:

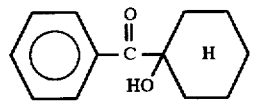

As bis(4-methacryloylthiophenyl) sulphide (BMATPS) is a white powder at room temperature, the mixtures including this monomer were manufactured by dissolving the monomers in a suitable solvent. (This solvent may in fact consist of the other monomers of the mixture and, in particular, of the comonomer II).

EXAMPLES 1 TO 16

Lenses were prepared from the mixtures of Table 1 by adding to these mixtures, as photoinitiator, 0.070 parts by weight of APO and 0.035 parts by weight of Irgacure®184 per 100 parts by weight of mixture. The photoinitiator APO is 2,4,6-trimethylbenzoyldiphenylphosphine oxide of formula:

Lenses were also prepared from the compositions of Table 1 by adding thereto, as indicated above, the photoinitiators and, as anti-yellow agent, 2 parts by weight of 3-methyl-2-buten-1-ol per 100 parts by weight of mixtures.

The lenses were obtained by polymerization of the above mixtures by UV irradiation.

The lenses obtained were then subjected to recuring at a temperature of 110° C. for 2 hours.

Except where otherwise indicated, the lenses obtained were −2.00 D lenses. The thickness of the lenses was measured at the centre thereof.

For each of the lenses obtained, the yellow index was measured before and after recuring.

The lens compositions, thickness and yellow index before recuring, the yellow index after recuring, the refractive index, transmittance, density and Abbe number are given in Table 2 below.

TABLE 2

| Example No. | Composition | Thickness (mm) | Yellow index before recuring | Yellow index after recuring | Refractive index | Transmission | Density | Abbe number |
|---|---|---|---|---|---|---|---|---|
| 1* | Mixture 1 | 1.4 | 7.02 | 3.21 | 1.58 | 90 | 1.24 | 34 |
| 2 | Mixture 1 + 2 parts by weight 3-methyl-2-buten-1-ol | 1.4 | 2.98 | 2.85 | — | — | — | — |
| 3* | Mixture 2 | 1.6 | 11.56 | 3.60 | 1.58 | 90 | 1.18 | 35 |
| 4 | Mixture 2 + 2 parts by weight 3-methyl-2-buten-1-ol | 1.5 | 3.71 | 3.19 | — | — | — | — |
| 5* | Mixture 3 | 1.6 | 14.09 | 3.32 | 1.62 | 89 | 1.32 | 33 |
| 6 | Mixture 3 + 2 parts by weight 3-methyl-2-buten-1-ol | 1.4 | 4.66 | 2.27 | — | — | — | — |
| 7* | Mixture 4 | 1.3 | 1.84 | 1.12 | 1.591 | 90 | 1.27 | 41.5 |
| 8 | Mixture 4 + 2 parts by weight 3-methyl-2-buten-1-ol | 1.0 | 0.9 | 0.87 | — | — | — | — |
|  |  | 1.6 | 1.05 | 1.05 | — | — | — | — |
| 9* | Mixture 5 | 1.0 | 1.19 | 1.17 | 1.592 | 90 | 1.29 | 36 |
| 10 | Mixture 5 + 2 parts by weight 3-methyl-2-buten-1-ol | 0.8 | 0.90 | 0.86 | — | — | — | — |
|  |  | 1.3 | 1.04 | 1.04 | — | — | — | — |
| 11* | Mixture 6 | 1.0 | 1.21 | 1.05 | 1.580 | 90 | 1.21 | 37.5 |
|  |  | 2.4ᵃ | 1.44 | 1.39 | — | — | — | — |
| 12 | Mixture 6 + 2 parts by weight 3-methyl-2-buten-1-ol | 0.9 | 0.87 | 0.87 | — | — | — | — |
|  |  | 2.4ᵃ | 1.17 | 1.18 | — | — | — | — |
| 13* | Mixture 7 | 2.3 | 1.41 | 1.38 | 1.578 | 90 | 1.23 | 39 |
| 14 | Mixture 7 + 2 parts by weight 3-methyl-2-buten-1-ol | 2.2 | 1.17 | 1.20 | — | — | — | — |
| 15* | Mixture 8 | 2.9 | 4.06 | 2.18 | 1.624 | 89 | 1.31 | 35 |
| 16 | Mixture 8 + 2 parts by weight 3-methyl-2-buten-1-ol | 2.8 | 1.62 | 1.29 | — | — | — | — |

ᵃflat lens
*comparative

As shown by Table 2, the compositions according to the invention make it possible to obtain lenses having high refractive indexes of about 1.6 and even higher, and a very low yellow index.

EXAMPLES 17 TO 20

The examples below relate to a comparison of the yellow index for the lenses obtained from some of the mixtures described above and in an identical manner, but for various photoinitiator contents.

The lenses were obtained in the same manner as above and the results, as well as the photoinitiator contents, are indicated in Table 3 below.

TABLE 3

| Ex-ample No. | Composition | Photoinitiator content | | Thickness (mm) | YI after recuring |
|---|---|---|---|---|---|
| | | APO (parts by weight) | Irgacure 184 (parts by weight) | | |
| 17 | Mixture 4 | 0.4 | 0.4 | 1.4 | 1.61 |
| 18 | Mixture 4 + 2 parts by weight 3-methyl-2-buten-1-ol | 0.4 | 0.4 | 1.2 | 1.05 |
| 19 | Mixture 6 | 0.2 | 0.2 | 1.4 | 1.17 |
| 20 | Mixture 6 + 2 parts by weight 3-methyl-2-buten-1-ol | 0.2 | 0.2 | 1.45 | 0.95 |

As shown by Table 3, the yellow index is only weakly increased when the photoinitiator contents are increased, thereby making it possible to increase the rates of polymerization of the compositions according to the invention considerably without jeopardizing the yellow index of the polymerized compositions obtained.

EXAMPLE 21 AND COMPARATIVE EXAMPLE 22

Lenses were manufactured having a power of −2.00 dioptres and a thickness at the centre of 1.35 mm, by polymerizing mixture No. 4 with 2% by weight of 3-methyl-2-buten-1-ol (Example 21) and without anti-yellow additive (Comparative Example 22).

The two lenses were obtained by pouring the liquid mixtures into a mould consisting of two mould parts made of mineral glass which are kept together by a strip of adhesive tape at their edge. The moulds were then irradiated on both sides with a radiation of 80 W/cm² produced by ultraviolet lamps for about 3 minutes.

After this polymerization treatment, the lenses formed were removed from the moulds and subjected to recuring at 120° C. for 2 hours.

The two lenses, with and without anti-yellow agent, were insolated for 40 hours, under the same conditions, using a Suntest Hanau machine emitting a radiation with a power of 24.4 W/m² in the 300–400 nm spectral range.

The results of this insolation are given in Table 4 below.

TABLE 4

| | Example 21 | Comparative Example 22 |
|---|---|---|
| Yellow index before insolation | 0.80 | 1.10 |

TABLE 4-continued

| | Example 21 | Comparative Example 22 |
|---|---|---|
| Yellow index after insolation for 40 hours | 0.24 | 1.60 |
| ΔYI | 0.14 | 0.50 |

The above results show that lenses manufactured from compositions according to the invention have a resistance to yellowing, under the effect of an insolation, which is markedly superior relative to lenses manufactured from similar compositions containing no anti-yellow agent according to the invention.

We claim:

1. Transparent polymer obtained by polymerization of a composition comprising:

a component A comprising:

at least 10% by weight of a monomer or a mixture of monomers (I), containing at least one thioacrylate or thiomethacrylate function of formula: 9

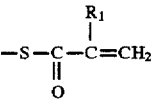

wherein $R_1$ is H or $CH_3$;

0 to 90% by weight of one or more monomers (II) which are copolymerizable by a radical route, wherein said monomers are selected from the group consisting of mono- or polyfunctional vinyl, acrylic and methacrylic monomers; and a component B comprising, relative to the weight of the component A:

0.1 to 15% by weight of one or more monomers (III) containing an ethylenic unsaturation which does not contribute to an aromatic system and having a carbon bearing a free hydroxyl group in an α position relative to the ethylenic unsaturation.

2. Polymer composition according to claim 1, wherein the monomer (III) contains, in a position α to the unsaturation, a carbon atom bearing a free hydroxyl group which is linked to at least one hydrogen atom.

3. Polymer composition according to claim 1, wherein the monomer (III) corresponds to the formula:

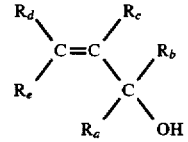

in which:

$R_a$ and $R_b$ represent hydrogen, or one of the groups $R_a$ and $R_b$ represents hydrogen while the other forms with the group $R_e$ a $C_5$–$C_{10}$ ring which may be substituted with one or more linear or branched $C_1$–$C_4$ alkyl groups or one or more $C_2$–$C_4$ alkylene groups; or one of the groups $R_a$ and $R_b$ may represent hydrogen while the other represents a $C_1$–$C_6$ aliphatic alkyl group, a $C_4$–$C_{16}$ cyclic hydrocarbon group or a $C_6$–$C_{16}$ aromatic hydrocarbon group;

$R_c$, $R_d$ and $R_e$ represent, independently of each other, hydrogen or a $C_1$–$C_6$ alkyl group which may be substituted with one or more OH groups, and in which the chain may be interrupted by one or more ether, ester or ketone groups; a $C_6$–$C_{16}$ aromatic hydrocarbon group or a $C_4$–$C_{16}$ cyclic hydrocarbon group;

$R_e$ may form with one of the groups $R_a$ or $R_b$ a $C_5$–$C_{10}$ ring which may be substituted with one or more linear or branched $C_1$–$C_4$ alkyl groups or one or more $C_2$–$C_4$ alkylene groups;

$R_c$ and $R_d$ may form a $C_5$–$C_{10}$ ring which may be substituted with one or more $C_1$–$C_4$ alkyl groups or $C_2$–$C_4$ alkylene groups; two or more of the carbon atoms of the $C_5$–$C_{10}$ ring formed with $R_a$ or $R_b$ and $R_e$ or with $R_c$ and $R_d$ may be linked by a hydrocarbon bridge.

4. Polymer composition according to claim 3, wherein $R_a$ and $R_b$ represent hydrogen, $R_c$ represents a methyl group, $R_d$ represents hydrogen or a methyl group and $R_e$ represents hydrogen, a methyl group, an ethyl group or —$CH_2OH$.

5. Polymer composition according to claim 3, wherein the monomer (III) is chosen from the group composed of allyl alcohol, methallyl alcohol, crotyl alcohol, 2-cyclohexen-1-ol, trans-2-hexen-1-ol, cis-2-butene-1,4-diol, 3-methyl-2-buten-1-ol, trans-2-methyl-3-phenyl-2-propen-1-ol, 3-buten-2-ol, carveol, myrtenol, verbenol and trans-cinnamyl alcohol.

6. Composition according to claim 1, wherein the monomer (I) corresponds to the formula:

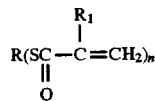

in which:

R represents a linear or branched, monovalent or polyvalent aliphatic hydrocarbon radical or an aryl group linked to the sulphur atom of the thio(meth)acrylate group or groups by an aromatic ring or by an intermediate linear alkyl chain, it being possible for the radical R to contain in its chain one or more groups chosen from —O—, —S— and

$R_1$ represents hydrogen or —$CH_3$; and n is an integer from 1 to 6.

7. Composition according to claim 6, wherein n is an integer from 1 to 3.

8. Polymer composition according to claim 1, wherein the monomers (I) are chosen from:

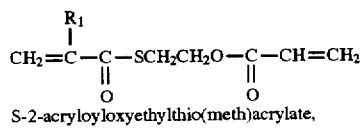
S-2-acryloyloxyethylthio(meth)acrylate,

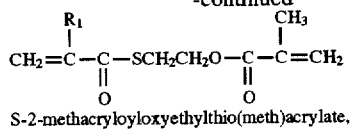
S-2-methacryloyloxyethylthio(meth)acrylate,

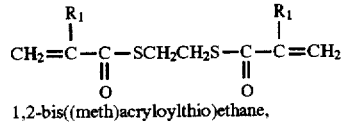
1,2-bis((meth)acryloylthio)ethane,

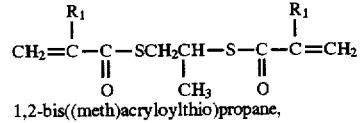
1,2-bis((meth)acryloylthio)propane,

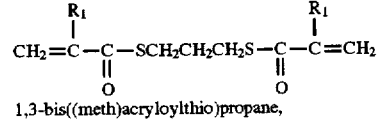
1,3-bis((meth)acryloylthio)propane,

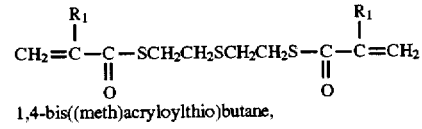
1,4-bis((meth)acryloylthio)butane, bis(2-(meth)acryloylthioethyl)ether,

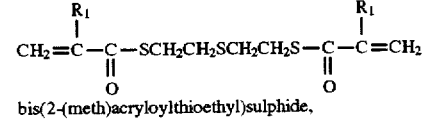
bis(2-(meth)acryloylthioethyl)sulphide,

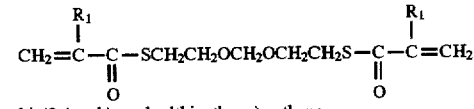
bis(2-(meth)acryloylthioethoxy)methane,

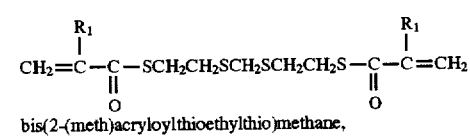
bis(2-(meth)acryloylthioethylthio)methane,

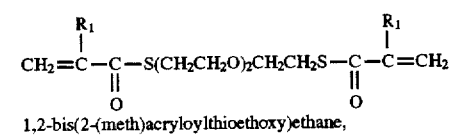
1,2-bis(2-(meth)acryloylthioethoxy)ethane,

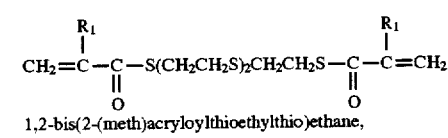
1,2-bis(2-(meth)acryloylthioethylthio)ethane,

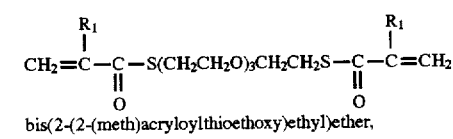
bis(2-(2-(meth)acryloylthioethoxy)ethyl)ether,

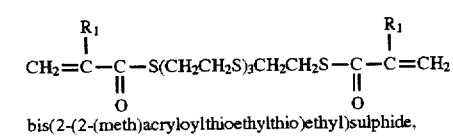
bis(2-(2-(meth)acryloylthioethylthio)ethyl)sulphide,

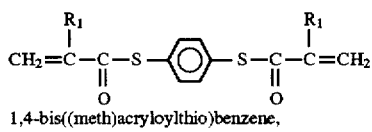
1,4-bis((meth)acryloylthio)benzene,

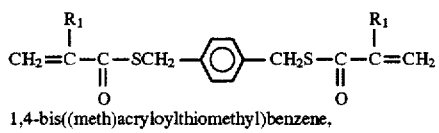
1,4-bis((meth)acryloylthiomethyl)benzene,

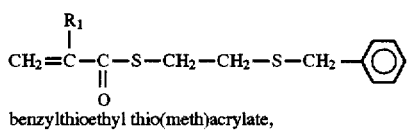
benzylthioethyl thio(meth)acrylate,

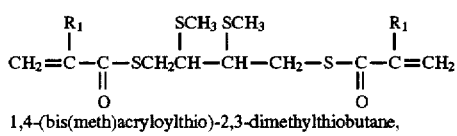
1,4-(bis(meth)acryloylthio)-2,3-dimethylthiobutane,

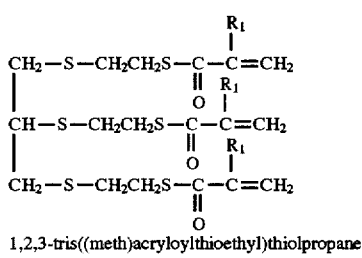
1,2,3-tris((meth)acryloylthioethyl)thiolpropane, and

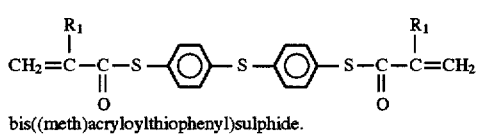
bis((meth)acryloylthiophenyl)sulphide.

9. Polymer composition according to claim 1, wherein the monomers (I) represent 20 to 60% by weight of the component A.

10. Polymer composition according to claim 1, wherein the comonomers (II) are chosen from mono- or polyvalent vinyl, acrylic or methacrylic comonomers.

11. Polymer composition according to claim 10, wherein the component A comprises a mixture of comonomers (II), at least one of these comonomers being a comonomer of formula (IV):

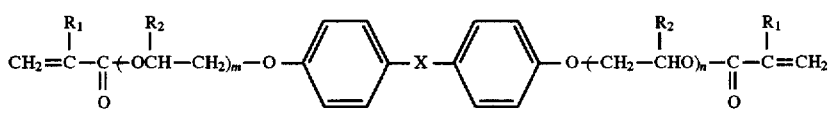

in which $R_1$ and $R_2$ denote, independently of each other, hydrogen or a $C_1$–$C_6$ lower alkyl radical, X denotes O, S, CO, $SO_2$, —$CH_2$—, —CH=CH— or

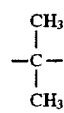

the sum m+n is between 0 and 10 inclusive.

12. Polymer composition according to claim 10, wherein the comonomer or comonomers of formula (IV) represent less than 50% by weight of the component A.

13. Polymerizable composition for lenses, wherein:

a component A comprises:
at least 10% by weight of a monomer or of a mixture of monomers (I), containing at least one thioacrylate or thiomethacrylate function;
0 to 90% by weight of one or more mono- or polyfunctional vinyl, acrylic or methacrylic comonomers (II); and a component B comprises relative to the weight of the component A:
0.1 to 15% by weight of one or more monomers (III) containing an ethylenic unsaturation which does not contribute to an aromatic system and having a carbon bearing a free hydroxyl group in an α position relative to the ethylenic unsaturation.

14. Polymerizable composition for a lens comprising, a component A comprising:
at least 10% by weight of a monomer or of a mixture of monomers (I) containing at least one thioacrylate or thiomethacrylate function;
0 to 90% by weight of one or more mono- or polyfunctional vinyl, acrylic or methacrylic comonomers (II); and a component B comprising, relative to the weight of the component A:
0.1 to 15% by weight of one or more monomers (III) containing an ethylenic unsaturation which does not contribute to an aromatic system and having a carbon bearing a free hydroxyl group in an α position relative to the ethylenic unsaturation;

wherein monomer (III) contains, in a position a to the unsaturation, a carbon atom bearing a free hydroxyl group which is linked to at least one hydrogen atom.

15. Process for the preparation of the polymer composition defined in claim 1, wherein the component A is mixed in the presence of a polymerization catalyst or initiator and in that 0.1 to 15% by weight of component B, relative to the total weight of component A, is added and in that the polymerization is carried out.

16. Process for the preparation of the polymer composition according to claim 15, wherein the polymerization is carried out by a photochemical route.

* * * * *